(12) United States Patent
Mo (10) Patent No.: US 8,208,170 B2
(45) Date of Patent: Jun. 26, 2012

(54) SYSTEM AND METHOD FOR PRINTING TARGET COLORS WITH PROCESS COLORS UTILIZING PARALLEL FEEDFORWARD NEURAL NETWORKS

(75) Inventor: Song-Feng Mo, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 929 days.

(21) Appl. No.: 12/249,198

(22) Filed: Oct. 10, 2008

(65) Prior Publication Data

US 2010/0091305 A1 Apr. 15, 2010

(51) Int. Cl.
*H04N 1/60* (2006.01)

(52) U.S. Cl. ......... 358/1.9; 358/504; 358/518; 358/520; 382/156; 382/162; 382/167

(58) Field of Classification Search .................... 358/1.9, 358/504, 518, 520, 522, 523, 524; 382/155, 382/156, 157, 162, 167
See application file for complete search history.

(56) References Cited

U.S. PATENT DOCUMENTS

| | | | | |
|---|---|---|---|---|
| 5,109,275 A * | 4/1992 | Naka et al. | ..................... | 358/518 |
| 5,162,899 A * | 11/1992 | Naka et al. | ..................... | 358/518 |
| 5,285,297 A * | 2/1994 | Rose et al. | ..................... | 358/518 |
| 5,425,134 A | 6/1995 | Ishida | | |
| 5,477,308 A * | 12/1995 | Ohnishi et al. | ................. | 382/155 |
| 5,506,696 A * | 4/1996 | Nakano | ......................... | 358/504 |
| 5,546,195 A | 8/1996 | Arai | | |
| 5,699,450 A * | 12/1997 | Stearns et al. | ................ | 382/156 |
| 5,748,329 A * | 5/1998 | Chang | ........................... | 382/167 |
| 5,774,230 A * | 6/1998 | Goto | ............................. | 382/162 |
| 5,828,781 A * | 10/1998 | Nakano | ......................... | 382/167 |
| 5,967,050 A | 10/1999 | Seymour | | |
| 6,014,457 A | 1/2000 | Kubo et al. | | |
| 6,330,078 B1 | 12/2001 | Wang | | |
| 6,473,197 B1 * | 10/2002 | Shimazaki | ..................... | 358/1.9 |
| 6,480,299 B1 | 11/2002 | Drakopoulos et al. | | |
| 6,580,524 B1 | 6/2003 | Weichmann et al. | | |
| 6,647,130 B2 | 11/2003 | Rhoads | | |
| 6,705,229 B2 * | 3/2004 | Frankenberger | .............. | 101/484 |
| 6,744,531 B1 | 6/2004 | Mestha et al. | | |
| 7,017,492 B2 | 3/2006 | Seymour | | |
| 7,075,643 B2 | 7/2006 | Holub | | |
| 7,142,711 B2 | 11/2006 | Goto et al. | | |
| 7,215,442 B2 | 5/2007 | Yamauchi et al. | | |
| 7,312,891 B2 | 12/2007 | Tsuchiya et al. | | |
| 7,345,691 B2 * | 3/2008 | Chien | ............................ | 382/162 |
| 7,480,083 B2 | 1/2009 | Takahashi et al. | | |
| 2002/0154326 A1 | 10/2002 | Tsuchiya et al. | | |
| 2003/0020703 A1 | 1/2003 | Holub | | |
| 2003/0031341 A1 | 2/2003 | Rhoads | | |
| 2003/0133607 A1 | 7/2003 | Goto et al. | | |
| 2004/0036896 A1 | 2/2004 | Yamauchi et al. | | |
| 2004/0177783 A1 | 9/2004 | Seymour | | |
| 2005/0111017 A1 | 5/2005 | Takahashi et al. | | |
| 2006/0023272 A1 | 2/2006 | Tezuka | | |
| 2006/0072128 A1 | 4/2006 | Ng et al. | | |

(Continued)

*Primary Examiner* — Kimberly A Williams (74) *Attorney, Agent, or Firm* — Kermit D. Lopez; Luis M. Ortiz; Tuesday A. Kaasch (57) ABSTRACT

A system and method for printing target colors includes a print-engine interface and a neural network component. The print-engine interface is in operative communication with a print engine of a printing system. The neural network component is calibrated to the print engine for printing a target color on a substrate. The neural network is in operative communication with the print-engine interface and communicates a parameter associated with printing the target color on the substrate utilizing the print engine.

17 Claims, 7 Drawing Sheets

U.S. PATENT DOCUMENTS

| | | |
|---|---|---|
| 2006/0082844 A1 | 4/2006 | White |
| 2006/0197757 A1 | 9/2006 | Holub |
| 2006/0280360 A1 | 12/2006 | Holub |
| 2007/0143089 A1 | 6/2007 | Sakai et al. |
| 2007/0195355 A1 | 8/2007 | Banton |
| 2007/0242287 A1 | 10/2007 | Banton et al. |
| 2007/0291289 A1 | 12/2007 | Kuo et al. |
| 2007/0291312 A1 | 12/2007 | Kaneko et al. |
| 2008/0068625 A1 | 3/2008 | Ng et al. |
| 2008/0130022 A1 | 6/2008 | Dalal et al. |
| 2008/0137149 A1 | 6/2008 | Loce et al. |
| 2008/0137914 A1 | 6/2008 | Minhas |
| 2008/0239344 A1 | 10/2008 | Wang et al. |
| 2008/0278744 A1 | 11/2008 | Marchesotti et al. |
| 2009/0033955 A1 | 2/2009 | Harigai |
| 2010/0091305 A1* | 4/2010 | Mo .................. 358/1.9 |

* cited by examiner

| C PREDICT | M PREDICT | Y PREDICT | | C TARGET | M TARGET | Y TARGET |
|---|---|---|---|---|---|---|
| 0 | 0 | 129 | | 0 | 0 | 128 |
| 0 | 0 | 250 | | 0 | 0 | 255 |
| 0 | 126 | 1 | | 0 | 128 | 0 |
| 1 | 128 | 128 | | 0 | 128 | 128 |
| 0 | 128 | 255 | | 0 | 128 | 255 |
| 0 | 249 | 1 | | 0 | 255 | 0 |
| 0 | 253 | 128 | | 0 | 255 | 128 |
| 0 | 255 | 255 | | 0 | 255 | 255 |
| 128 | 2 | 1 | | 128 | 0 | 0 |
| 128 | 0 | 129 | | 128 | 0 | 128 |
| 128 | 1 | 255 | | 128 | 0 | 255 |
| 128 | 128 | 1 | | 128 | 128 | 0 |
| 128 | 128 | 255 | | 128 | 128 | 255 |
| 128 | 254 | 1 | | 128 | 255 | 0 |
| 128 | 254 | 127 | | 128 | 255 | 128 |
| 128 | 255 | 255 | | 128 | 255 | 255 |
| 252 | 0 | 1 | | 255 | 0 | 0 |
| 255 | 0 | 127 | | 255 | 0 | 128 |
| 255 | 0 | 255 | | 255 | 0 | 255 |
| 255 | 128 | 1 | | 255 | 128 | 0 |
| 252 | 127 | 129 | | 255 | 128 | 128 |
| 253 | 128 | 253 | | 255 | 128 | 255 |

SYSTEM AND METHOD FOR PRINTING TARGET COLORS WITH PROCESS COLORS UTILIZING PARALLEL FEEDFORWARD NEURAL NETWORKS

BACKGROUND

1. Technical Field

The present disclosure relates to printing systems, and in particular, to a system and method for printing target colors with process colors utilizing parallel feedfoward neural networks.

2. Description of Related Art

In most multi-color printing systems, multiple color separations are used for marking a substrate, e.g. paper. Each of these color separations mark the substrate with a single colorant, that is, each separation marks the substrate with only one specific colorant, which is different from the colorants of the other color separations. The colorants commonly used are cyan, magenta, yellow and black, also referred to as CMYK. These colorants are commonly referred to as "process colors" because of their wide availability and universal usage. "Colorant" refers, for example, to pigments, dyes, mixtures thereof, such as mixtures of dyes, mixtures of pigments, mixtures of dyes and pigments, and the like. These colorants are also commonly referred to as "inks" or "toners", and for the purposes of the disclosed subject matter, these terms are to be considered interchangeable. Additionally, the term "printing system" is considered equivalent to and interchangeable with an image forming apparatus, a printer, a printing machine, a copier, a facsimile machine, a multifunction device (e.g., a scanner integrated with a printer), a electrophotography device, a xerography device, an electrophotographic device, a electrostatographic device and/or the like.

As previously mentioned, multi-color printing systems utilize a limited number of color separations for marking a substrate, however, a much wider variety of colors is achievable. Each separation marks the substrate using discrete shapes, such as dots having a circular or oval shape, or periodic line patterns, which in aggregate create a larger set of colors for perception. This concept is generally known as color half-toning, and involves combining two or more patterned separations on the substrate. The selection of color separations and halftone pattern designs are carefully chosen for achieving a desired color.

Although some multi-color printing schemes use CMYK color separations, one technique utilizes a single colorant to precisely print a specific color. These colorants are specially made and are added to the printing system as a fifth color, or as a single color in specially made printing systems. More precise colorants are usually referred to as "spot colors" because they are applied on a particular spot of the substrate. One system of categorizing spot colors is referred to as the "pantone color" color system. These spot colors are used to precisely display colors such as in logos, trademarks, service marks, and brands, because it is desirable for a company or institution to have the public at large (and especially customers) to readily recognize these types of reproduced items. Target colors are defined herein as a color desired by a user, machine, process, software, a printing system technician, a graphics artist, and the like, for printing with sufficient precision of expected human perception; in other words, a "target color" is some color that has to be obtained with sufficient precision, such as by using CMYK colors or with the addition of some specially-bended toner or ink e.g., CMYK+.

Pantone colors and spot colors may be a target color of a printing system. Target colors may be obtained using the CMK color separations, using specially blended toners or inks, or using printing systems having more than four color separations, e.g., CMYK+ systems. Accurate and repeatable colors facilitate easy recognition of these reproduced items slowly, over time, and after several repeated exposures, making these items easily recognizable by the public at large.

Most printer manufactures make special inks for spot color printing, however, there is customer demand for using the process color for spot color printing as well. Using CMYK color separations to make "spot colors" requires color printing accuracy. Additionally, the color accuracy should be uniform across multiple print engines although there may be slight manufacturing differences between print engines of different models or between print engines of the same printer models.

SUMMARY

The present disclosure relates to printing systems, and in particular, to a system and method for printing target colors with process colors utilizing parallel feedfoward neural networks.

In one embodiment of the present disclosure, a system for printing target colors includes a print-engine interface and a neural network component. The print-engine interface is in operative communication with a print engine of a printing system. The neural network component is calibrated to the print engine for printing a target color on a substrate. The neural network is in operative communication with the print-engine interface and communicates a parameter associated with printing the target color on the substrate utilizing the print engine. The print engine may utilize four or more colorants, e.g., a CMYK print engine, or a print engine that utilizes more than four colorants.

The neural network component can include one or more neural networks, e.g., feedforward neural networks. One or more of the neural networks can be arranged in parallel and one or more may be a three-layer neural network, or a more than three multi-layer neural network. Additionally or alternatively, the system may be an installable module installable in a printing system.

In another embodiment of the present disclosure, each of the neural networks can be adapted to receive a set of inputs, e.g., the set of inputs may point within one of a Hunter 1948 L, a, b color space, a CIE 1976 (L*, a*, b*) color space, and/or a CIE 1931 XYZ color space. Also, each neural network of the system can output one or more parameters associated with printing the target color on the substrate utilizing the print engine such as a control parameter for controlling a color separation of the print engine. Each neural network of the system can output a Cin value for a color separation, for example, a Cin value may be used to control one or more of: a color separation, a Cyan color separation, a Magenta color separation, a Yellow color separation, and/or a Black color separation of the print engine in a four (or more) colorant system. Each neural network may output only a single control parameter, e.g., a particular neural network outputs only a Cin value for controlling the Cyan color separation of the print engine. A Cin value may be in some embodiments a binary number representing a percent converge of that color separation as marked on the substrate.

In another embodiment of the present disclosure, the system includes a calibration component. The calibration is adapted to calibrate a neural network of the neural network component. The calibration component calibrates the neural network to the print engine for printing target colors on the substrate utilizing the print engine. The calibration component includes a color test pattern analysis component for calibrating the neural network by analyzing one or more color test patterns. The calibration component communicates with a spectrometer to measure one or more of the color test patterns. The calibration component can calibrate the neural network to the print engine utilizing a quick propagation algorithm configured to converge. Additionally or alternatively, the calibration component is in operative communication with a color sensing device. The color sensing device measures the color test pattern thereby facilitating the color test pattern analysis component to analyze one or more color test patterns. The color sensing device may be disposed within (or along the print path or substrate propagation path) the printing system to measure the color test pattern therein.

In another embodiment of the present disclosure, a method for printing target colors includes: providing a neural network; calibrating the neural network to the print engine of the printing system for printing target colors; and communicating a parameter between the print engine and the neural network. The parameter is associated with printing the target colors.

Calibrating the neural network includes printing a color test pattern, measuring and/or analyzing the color test pattern, and modifying a node of the neural network in accordance with the analyzed color test pattern. The method can modify the node by modifying one or more weights of the node. The method may calibrate the node by updating a weight to a node of the neural network using quick propagation and/or by utilizing a back-propagating algorithm with momentum to adjust one or more weights to the node of the neural network.

In yet another embodiment of the present disclosure, a system for printing target colors includes a print-engine and a plurality of feedfoward neural networks. The print-engine is adapted to mark a substrate with a plurality of colorants. Each of the plurality of feedfoward neural network is adapted for being trained to control a single colorant of the plurality of colorants. Each of the plurality of feedfoward neural networks is further adapted for being trained separately to each other and to receive a common input. The plurality of feedfoward neural networks is adapted for parallel integration to control the print-engine to mark the substrate with the plurality of colorants.

BRIEF DESCRIPTION OF THE DRAWINGS

These and other advantages will become more apparent from the following detailed description of the various embodiments of the present disclosure with reference to the drawings wherein.

DETAILED DESCRIPTION

Figure 1:
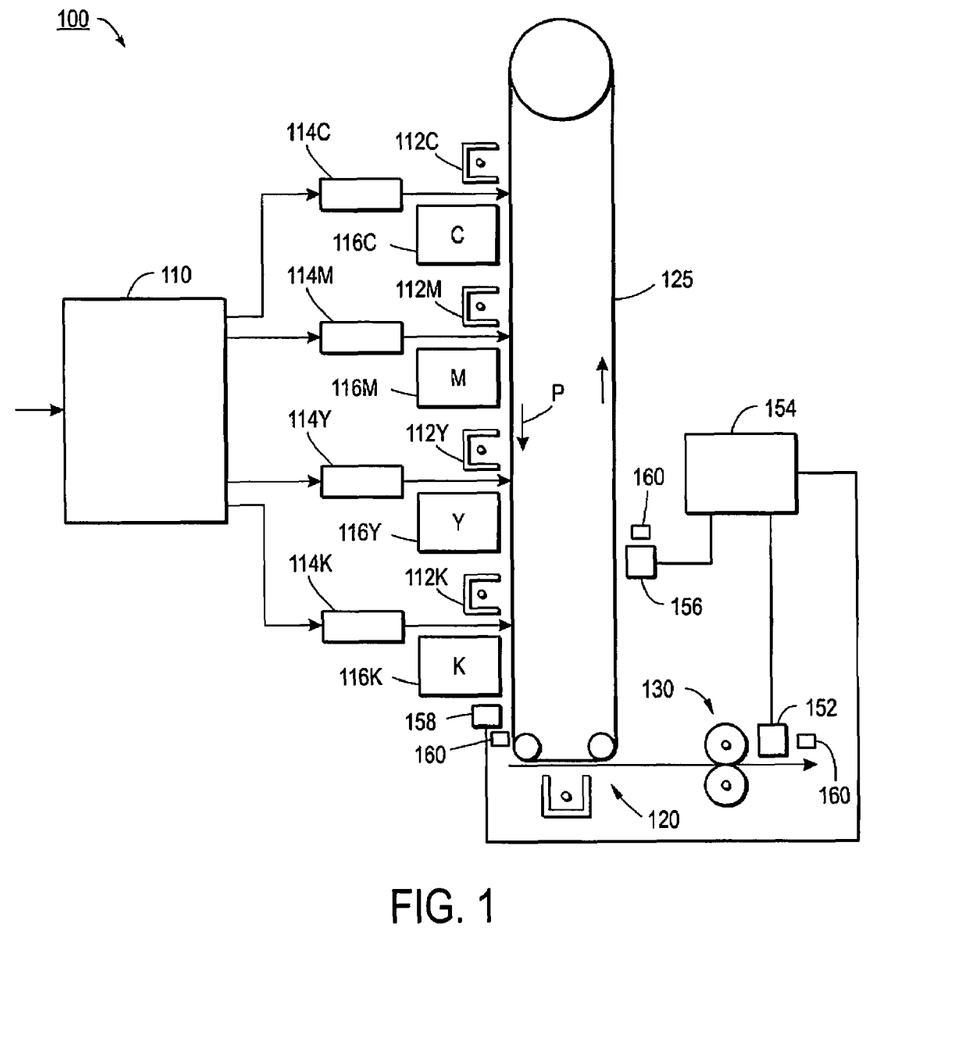
FIG. 1 is a schematic showing a printer for printing target colors using the print engine of the printer in accordance with the present disclosure.

FIG. 1 is a schematic showing a printer 100 for printing target colors in accordance with the present disclosure. Specifically, there is shown an "image-on-image" xerographic color printer, in which successive color images are accumulated on a photoreceptor belt, and the accumulated superimposed images are in one step directly transferred to an output sheet as a full-color image. In one implementation, the Xerox® iGen4® digital printing press (also referred to herein as "printer") may be utilized. However, it is appreciated that any printer, such as monochrome machines using any technology, machines which print on photosensitive substrates, xerographic machines with multiple photoreceptors, or inkjet-based machines, can beneficially utilize the present disclosure as well.

Specifically, the FIG. 1 embodiment includes a belt photoreceptor 125, along which are disposed a series of stations, as is generally familiar in the art of xerography, one set for each color of ink or toner to be printed. For instance, to place a cyan color separation image on photoreceptor 125, there is used a charge corotron 112C, an imaging laser 114C, and a development unit 116C. For successive color separations, there is provided equivalent elements 112M, 114M, 116M (for magenta), 112Y, 114Y, 116Y (for yellow), and 112K, 114K, 116K (for black). The successive color separations are built up in a superimposed manner on the surface of photoreceptor 125, and then the combined full-color image is transferred at transfer station 120 to an output sheet. The output sheet is then run through a fuser 130, as is familiar in xerography. Printing process may be controlled, for example, by a print controller 110. Print controller 110 may include one or more neural networks (discussed below).

As is familiar in the art of "laser printing," by coordinating the modulation of the various lasers with the motion of photoreceptor 125 and other hardware (such as rotating mirrors, etc., not shown), the lasers discharge areas on photoreceptor 125 to create the desired printing, particularly after these areas are developed by their respective development units 116C, 116M, 116Y, 116K.

In one implementation, a color sensing device 160 may be placed in the printing device to directly monitor printed critical colors as they exit the device, for example, at location 152. In another implementation, the color sensing device 160, as described above, can be placed just before or just after the transfer station 125 where the toner is transferred to the sheet, for example, at locations 156, 158 for monitoring colors directly on the photoreceptor belt or other intermediate transfer members. The color sensing device can make measurements to images created on the photoreceptor 125 (such as color sensing devices 156 and 158) or to printed images which were transferred to an output sheet (such as color sensing device 152).

The color sensing devices 152, 156 and 158 provide feed back to a control device 154 for taking action in response to critical color measurements. There may be provided any number of color sensing device placed anywhere in the printer as needed, not only in the locations illustrated.

The information gathered therefrom is used by control device 154 and/or the print controller 110 in various ways to aid in the operation of the printer, whether in a real-time feedback loop, an offline calibration process, a registration system, etc. While the control device 154 are shown in the figure as being separate elements, it will be appreciated that in some implementations, the control device 154 may be a part of the print controller 110.

Figure 2:
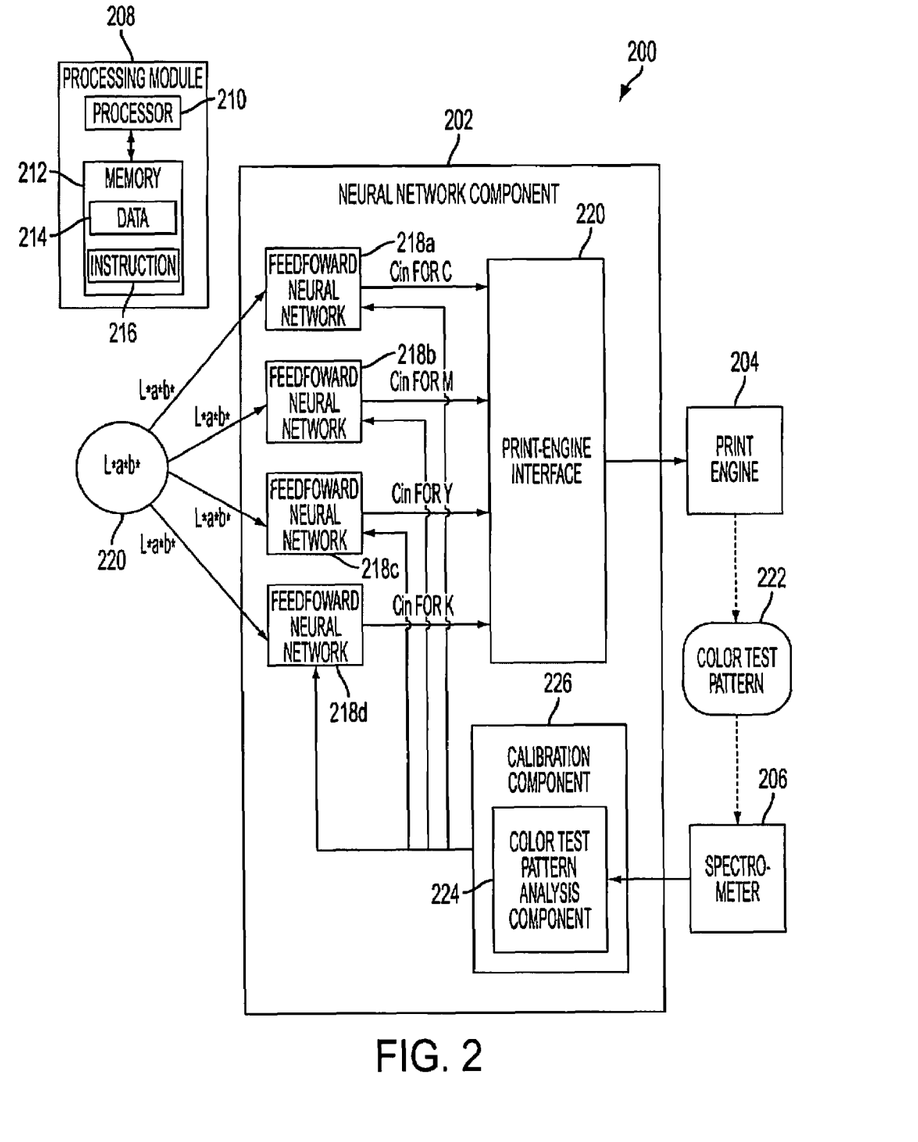
FIG. 2 is a block diagram of a system for printing target colors in accordance with the present disclosure.

Referring to the drawings, FIG. 2 is a block diagram of a system 200 for printing target colors in accordance with the present disclosure. System 200 may be implemented as part of controller 110 of FIG. 1, or separate therefrom. Neural network component 202 may be implemented (wholly or partially) in hardware, software, firmware, software in execution, bytecode, microcode, a virtual machine, the like, or some combination thereof. For example neural network component 202 may be implemented by an x86-processor based computer, a field-programmable gate array, a complex programmable logic device, programmable array logic and the like. Additionally or alternatively, each of neural networks 218a through 218d may be the implemented by the same computing device or separate computing devices. Print-engine interfaced 220 may include a network interface, (e.g., a TCP/IP controller) an operating system communications interface such as Inter-Process Communications and/or Intra-process communications, an application programming interface, a wireless transceiver, and the like. Additionally or alternatively, neural network component 202 may be part of printer 100, e.g., neural network component 202 may be an installable module installable in printer 100 and/or a PC in operative communication with printer 100.

Neural Network component 202 may include, in other embodiments, an arbitrary number of neural networks 218. Also, print engine 204 in some embodiments, may include an arbitrary number of color separations. Each of neural networks 218 controls a single one of color separations (not explicitly shown) of print engine 204. In some embodiments a black color separation (not explicitly identified) is controlled by a neural network 218d (also not explicitly identified); however in some embodiments, a black color separation does not have neural network control.

Neural network component 202 may be implemented by a processing module 208 that includes processor 210. Processor 210 may be a microprocessor, a microcontroller, a virtual processor on a virtual machine, an ASICS microchip, a soft microprocessor, software emulation of hardware, or other device sufficient for processing instructions. Additionally or alternatively, processor 210 may communication with memory 212. Memory 212 may include data 214 and/or instructions 216, e.g., processing module 208 may follow the Von Neumann architecture. Alternatively, in another embodiment, processing module 208 may follow the Harvard architecture, i.e., instructions 216 are outside of memory 212 and may be part of other memory (not depicted). Memory 212 may also include a stack and/or a heap.

Neural network component 202 includes feedfoward neural networks 218a through 218d. An input parameter 220 is received by neural network component 202. Input parameter 220 may be a L* a* b* value or other representation of a color. The input parameter 220 can represent a relative color value or an absolute color value. Input parameter 220 is received by feedfoward neural networks 218a through 218d. Input parameter 220 may include a color value representing a target color and/or other colors, and each of feedfoward neural networks 218 can be trained for input parameter 220. Feed forward neural networks 218 each calculates a Cin value for a color separation of print engine 204 after one or more of feedfoward neural networks 218 are calibrated, i.e., feedfoward neural network 218a calculates a Cin value for Cyan, feedfoward neural network 218b calculates a Cin value for Magenta, feedfoward neural network 218c calculates a Cin value for Yellow, and feedfoward neural network 218d calculates a Cin value Black. A Cin value is a binary number representing a percent of coverage of the color separation as printed on a substrate (e.g., paper) within a predefined region of the substrate. Additionally or alternatively and as previously mentioned, in some embodiments a Black color separation control is not implemented by a neural network. Also, in other embodiments not explicitly shown that utilize more than four color separations, the number of the neural networks may be equal to the number of the color separations utilized by the print engine.

Each of the Cin values from feedfoward neural networks 210 are communicated to print engine 204 via print engine interface 212. Neural network component 202 provides Cin values to cause print engine 204 to attempt to print a color having the L* a* b* value as represented by parameter 220. Neural network component 202 is calibrated to print engine 204. Print engines may vary from one printer to another and/or may vary between identically manufactured printers due to manufacturing variances. Therefore, neural network component 202 is trained for a specific print engine 204.

Specifically, neural network component 202 is trained for a subset of the color space printable by print engine 204, e.g., neural network component 202 is trained to print target colors utilizing print engine 204. To train neural network component 202, one or more of versions of color test pattern 222 are printed and analyzed by spectrometer 206. The color test pattern analysis component 224 receives data from spectrometer 206 and normalizes and/or performs processing on the data. Calibration component 226 controls the calibration of feedfoward neural networks 218. Calibration component 226 can train feedfoward neural networks 218 using a quick propagation algorithm and/or a back-propagation algorithm (discussed in more detail below). Feedfoward neural networks 218 can be trained offline, and once trained, may not need additional training and/or may need only periodic maintenance training (e.g., to adjust for ageing of print engine 204). The training time for feedfoward neural networks 218 may be up to (or about) 10 minutes for a specific print engine, e.g., print engine 204. Feedfoward neural networks 218 may be trained independently to each other (i.e., no nodes of feedfoward neural network 218a is connected to any of the nodes of feedfoward neural networks 218b through 218d) and thereafter arranged in a parallel fashion each having an output which controls a single color separation of print engine 204. Print engine 204 may be any printer using multiple colorants, e.g., a digital color, an offset printing system and the like. Additionally or alternatively, system 200 may control a 6 colorant printing system, in which neural network component 202 utilizes 6 (or 5 without black) neural networks, e.g., some printing systems utilize Cyan, Magenta, Yellow, Black, Orange and Green (or violet).

Figure 3:
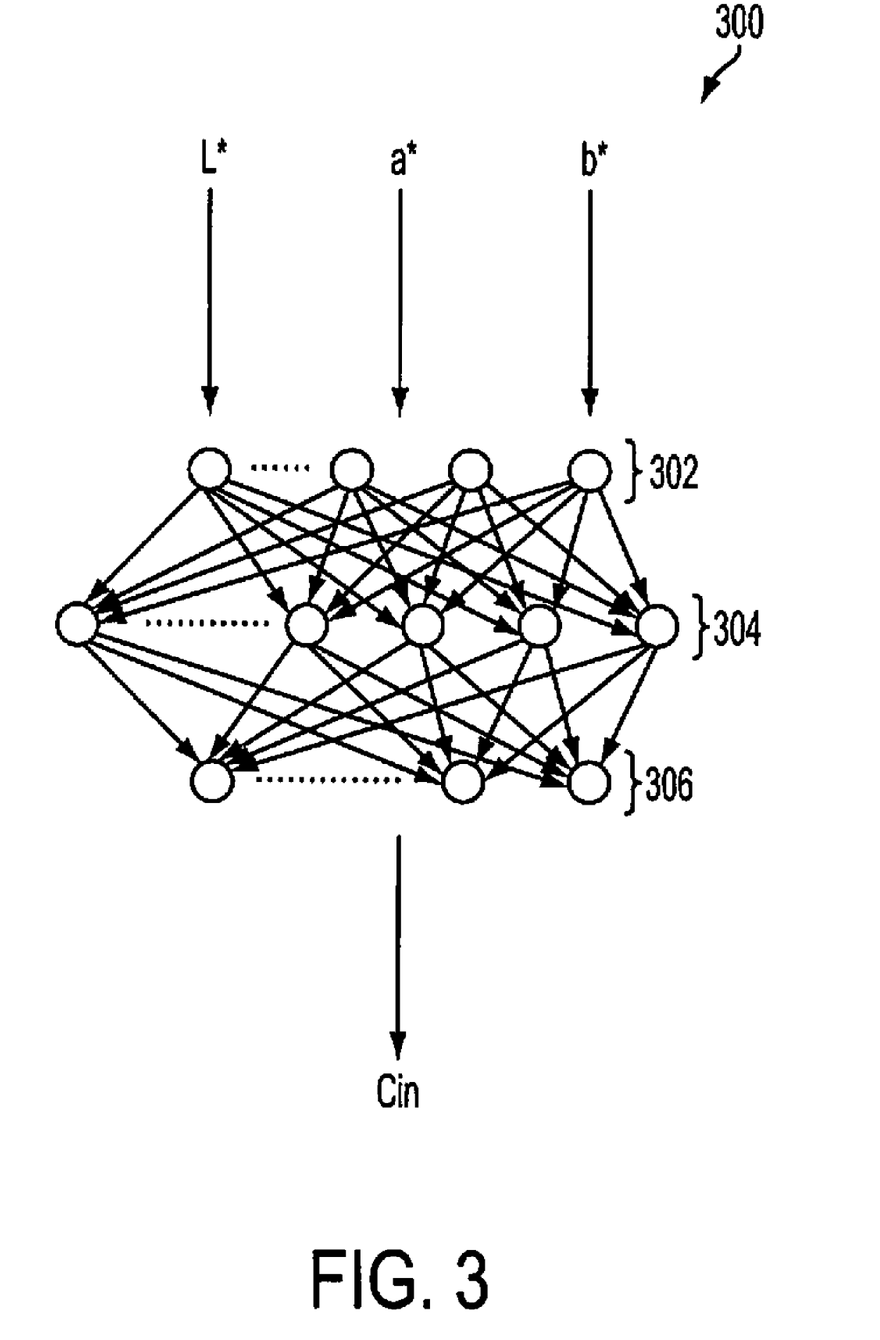
FIG. 3 is a diagram of a three-layer feedfoward neural network utilized by the system of FIG. 1 and/or FIG. 2 in accordance with the present disclosure.
Figure 4A:
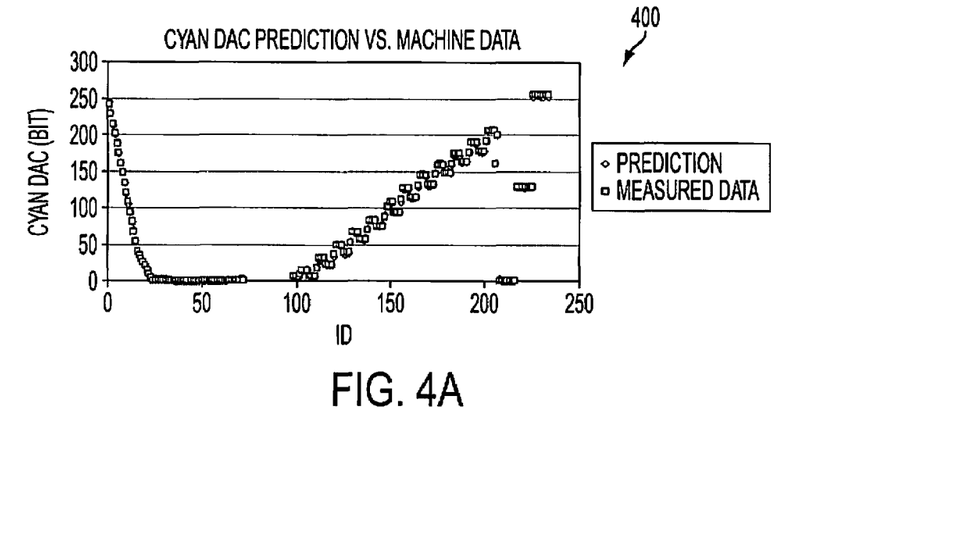
FIGS. 4A-4C shows prediction data of a trained neural network as compared to measured data in accordance with the present disclosure.
Figure 4B:
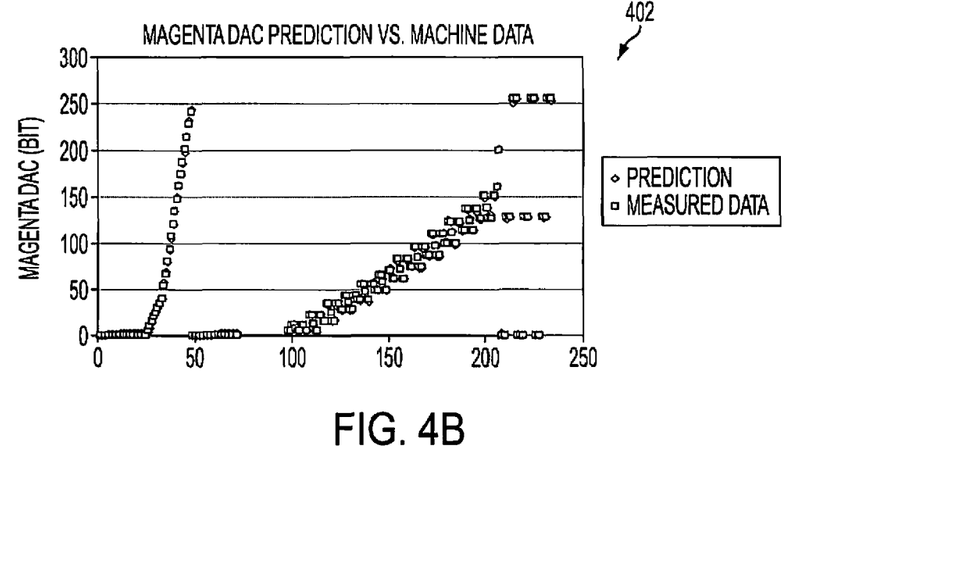
Figure 4C:
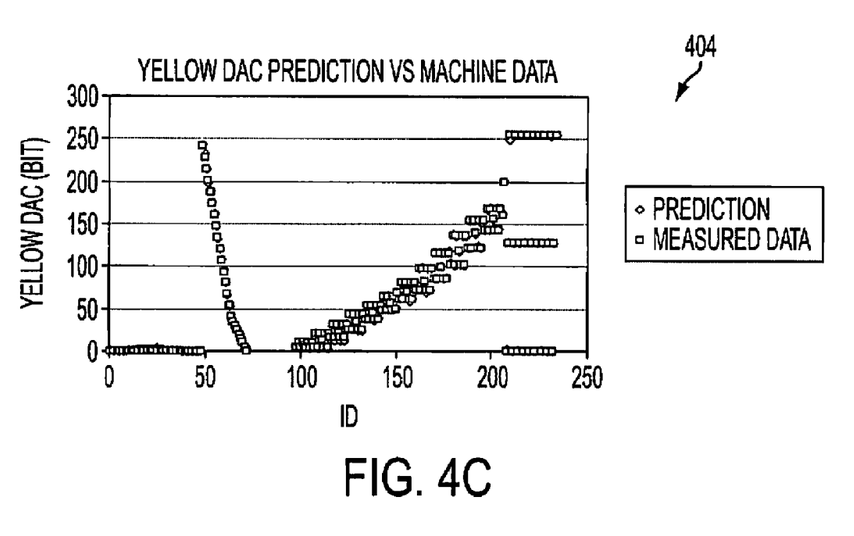

Referring to the drawings, FIG. 3 shows a three-layer feedfoward neural network 300 in accordance with the present disclosure. Neural network 300 includes input layer 302 (having input nodes), hidden layer 304 (having hidden nodes) and an output layer 305 (having output nodes). Neural network 300 receives a L* a* b* value and outputs a Cin value. Neural network 300 may be one or more of feedfoward neural networks 218a through 218d.

To train neural network 300, a mix of quick propagation and back-propagation algorithms may be used to train neural network 300 to the data from the printed test pattern. In other words, a quick propagation algorithm may be used to update the weights of the neural networks to a solution region quickly and a back-propagation algorithm with learning rate decay and momentum may be utilized to fine tune the weights of the neural networks to obtain an additional increase in color accuracy. The details of this are listed below.

Assume that in FIG. 3, output units are denoted by $O_i$, hidden units by $V_j$, and input terminals by $\xi_k$. There are connections $w_{jk}$ from the inputs to the hidden units, and $w_{ij}$ from the hidden units to the output units. The different patterns are labeled by a superscript µ. Given pattern µ, hidden unit j receives a net input as show in formula 1 as follows:

$$h_j^\mu = \sum_j wjk \cdot \xi_k^\mu, \tag{1}$$

which produces an output as shown below in formula 2 as:

$$V_j^\mu = g(h_j^\mu) = g\left(\sum_j wjk \cdot \xi_k^\mu\right). \quad (2)$$

Output unit i thus receives a value as shown in formula 3.

$$h_i^\mu = \sum_j wij \cdot V_j^\mu = \sum_j wijg\left(\sum_k wjk \cdot \xi_k^\mu\right). \quad (3)$$

The final output produced is shown in formula 4 as follows:

$$O_i^\mu = g(h_i^\mu) = g\left(\sum_j wijg\left(\sum_k wjk \cdot \xi_k^\mu\right)\right). \quad (4)$$

The cost function is defined as shown in formula 5 below:

$$E[w] = \frac{1}{2}\sum_{\mu i}[T_i^\mu - O_i^\mu]^2. \quad (5)$$

Where $T_i^\mu$ is the target of $O_i^\mu$,
formula 5 becomes formula 6 below:

$$E[w] = \frac{1}{2}\sum_{\mu i}\left[T_i^\mu - g\left(\sum_j wijg\left(\sum_k wjk \cdot \xi_k^\mu\right)\right)\right]^2. \quad (6)$$

For the hidden-to-output connections, we can adjust node weights by formula 7 below:

$$\Delta w_{ij} = -\eta \frac{\partial E}{\partial wij} \quad (7)$$

$$= \eta \sum_\mu [T_i^\mu - O_i^\mu]g'(h_i^\mu)V_j^\mu$$

$$= \eta \sum_\mu \delta_i^\mu V_j^\mu.$$

Additionally, note that the definition shown in formula 8 as follows:

$$\delta^\mu_i = g'(h^\mu_i)[T^\mu_i - O_i^\mu]. \quad (8)$$

For the input-to-hidden connections, we obtain formula 9 as follows:

$$\Delta w_{jk} = -\eta \frac{\partial E}{\partial wjk} \quad (9)$$

$$= \eta \sum_{\mu i}[T_i^\mu - O_i^\mu]g'(h_i^\mu)w_{ij}g'(h_j^\mu)\xi_k^\mu$$

$$= \eta \sum_{\mu i}\delta_i^\mu w_{ij}g'(h_j^\mu)\xi_k^\mu$$

$$= \eta \sum_\mu \delta_j^\mu \xi_k^\mu$$

Also note the definition as shown in formula 10 as follows:

$$\delta_j^\mu = g'(h_j^\mu)\sum_i w_{ij}\delta_i^\mu \quad (10)$$

At the iteration t:

$$W(t+1)=W(t)+\Delta W, \quad (11)$$

where W is either $w_{ij}$ or $w_{jk}$ and $\Delta W$ either $\Delta w_{ij}$ or $\Delta w_{jk}$
For quick propagation, the $\Delta w_{ij}$ is defined as follows in formula 12:

$$\Delta w_{ij}(t)=S(t)/(S(t-1)-S(t))*\Delta w_{ij}(t-1). \quad (12)$$

Neural network 300 may be trained using print engine 204's default color data test patterns offline to train neural network 300 for printing a target color. Although a color test pattern is used to train neural network 300, e.g., color test pattern 222 of FIG. 2, the specific target color need not be included, only a set of sufficiently surrounding colors to the desired target colors need to be included.

Figure 5:
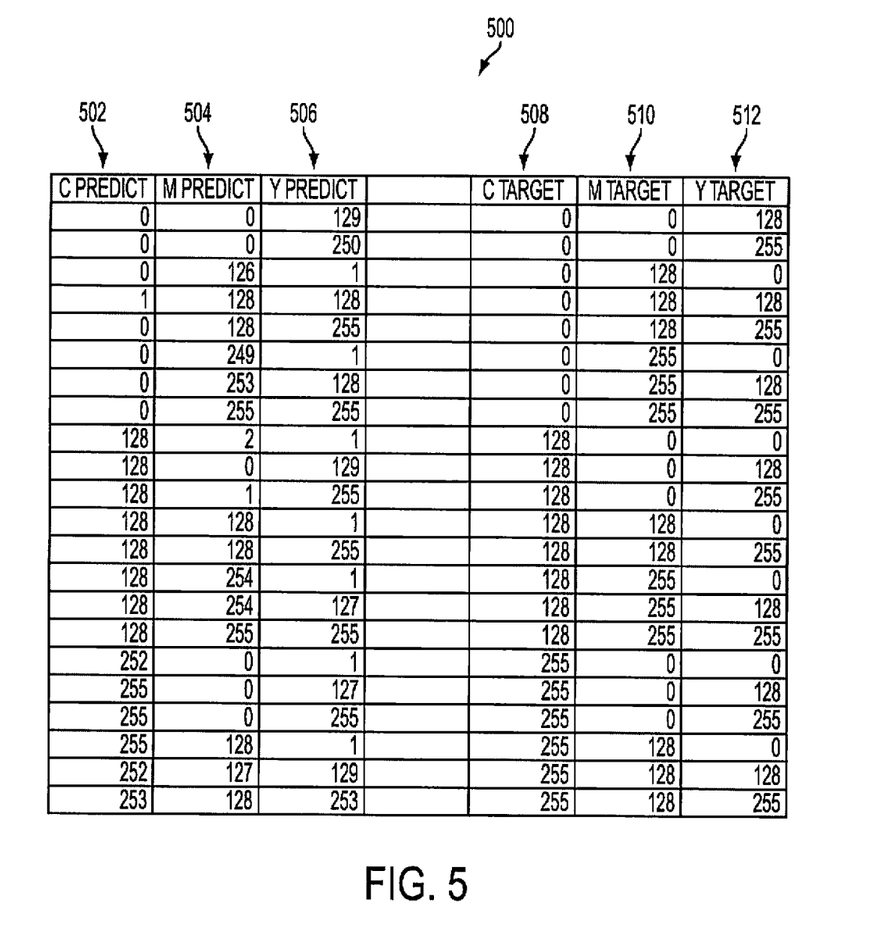
FIG. 5 is a table comparing prediction data of a trained neural network as compared to target data in accordance with the present disclosure.

FIGS. 4A-4C and FIG. 5 show the results of a trained three-layer feedfoward neural network. Chart 400 shows the results of a neural network trained to control a Cyan color separation, chart 402 shows the results of a neural network trained to control a Magenta color separation, chart 404 shows the results of a neural network trained to control a Yellow color separation. The results are a comparison of predicted data vs. measured data. FIG. 5 shows a table 500 comparing prediction data of a trained neural network as compared to target data in accordance with the present disclosure. Note that predicted digital values of Cyan, Magenta and Yellow are shown in columns 502, 504 and 506, respectively. Columns 502, 504 and 506 are for comparison to the target values of Cyan, Magenta, and Yellow as shown in columns 508, 510 and 512, respectively. As is easily seen in table 500, the trained neural networks target colors' predictions are sufficiently accurate.

Figure 6:
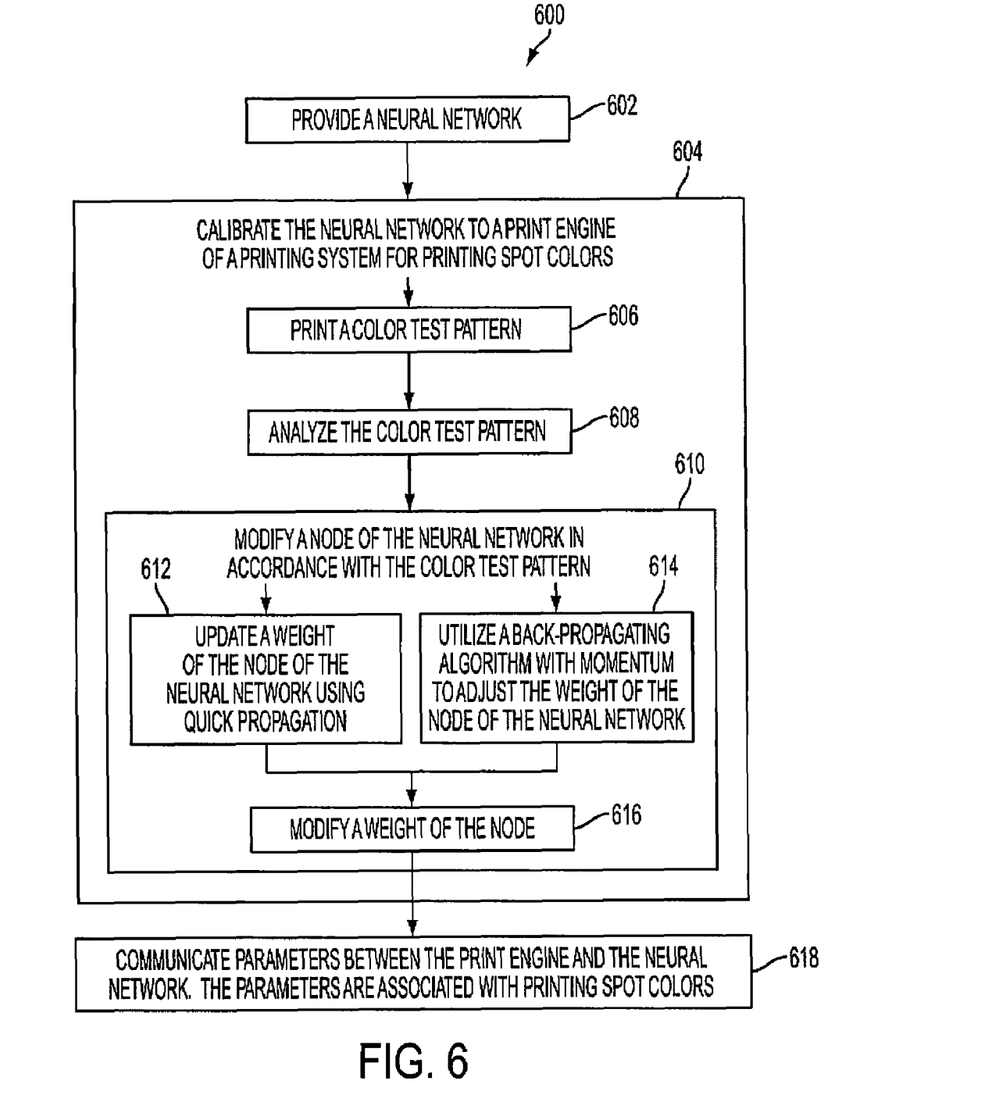
FIG. 6 is a flow chart diagram of a method for printing target colors in accordance with the present disclosure.

Referring to the drawings, FIG. 6 is a flow chart diagram of a method 600 for printing target colors in accordance with the present disclosure. Method 600 includes steps 602 through 618. Although the steps as show in FIG. 6 are show having a particular sequence, other sequences are contemplated and are the purview of one of ordinary skill in the relevant art. Additionally or alternatively, any of steps 602 through 618 may be performed in serial, in parallel, in a staggered fashion and/or may other steps shown or not shown.

Step 602 provides a neural network, e.g., one of neural networks 106 of FIG. 1, one of neural networks 218 of FIG. 2, and/or neural network 300 of FIG. 3. Step 604 calibrates the neural network to a print engine of a printing system for printing target colors. Step 606 prints a color test pattern and step 608 analyzes the color test pattern. Step 610 modifies a node of the neural network in accordance with the color test pattern. Step 610 may includes steps 612 through 616. Step 612 updates a weight of the node of the neural networking using quick propagation while step 614 utilizes a back-propagating algorithm with momentum to adjust the weights of the node of the neural network. Step 616 modifies a weight of the node, e.g., modifies one or more weight of one or more node of the neural network as deemed by one of the algorithms discussed with regards to steps 612 and/or 614. Step 618 communicates parameters between the print engine and the neural network. The parameters are associated with printing target colors.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A non-transitory computer-readable storage medium for printing target colors, said computer-readable storage medium embodying computer program code, said computer program code comprising computer executable instructions for:
    configuring a print-engine interface to be in operative communication with a print engine of a printing system;
    calibrating a neural network component to the print engine for printing at least one target color on a substrate, wherein the neural network component includes a plurality of neural networks configured to receive a set of inputs; and
    wherein each of the neural networks outputs to the print-engine interface a control parameter of a color separation of the print engine associated with printing the at least one target color on the substrate utilizing the print engine.

2. The non-transitory computer-readable storage medium according to claim 1, wherein the print engine utilizes at least four colorants.

3. The non-transitory computer-readable storage medium according to claim 1, wherein the neural network component includes at least two neural networks arranged in parallel.

4. The non-transitory computer-readable storage medium according to claim 3, wherein one of the at least two networks is a feed-forward neural network.

5. The non-transitory computer-readable storage medium according to claim 1, wherein the neural network component includes at least one three-layer neural network.

6. The non-transitory computer-readable storage medium according to claim 1, wherein the computer-readable storage medium is an installable module installable in the printing system.

7. The non-transitory computer-readable storage medium according to claim 1, wherein the set of inputs includes a point within at least one of a Hunter 1948 L, a, b color space, a CIE 1976 (L*, a*, b*) color space, and a CIE 1931 XYZ color space.

8. The non-transitory computer-readable storage medium according to claim 1, wherein each of the plurality of neural networks outputs a control parameter of a color separation of the print engine, wherein the at least one parameter includes the control parameter.

9. The non-transitory computer-readable storage medium according to claim 8, wherein the control parameter is a Cin value for one of a color separation, a Cyan color separation, a Magenta color separation, a Yellow color separation, and a Black color separation of the print engine.

10. The non-transitory computer-readable storage medium according to claim 1, wherein the only one control parameter is a Cin value for one of a color separation, a Cyan color separation, a Magenta color separation, a Yellow color separation, and a Black color separation of the print engine.

11. The non-transitory computer-readable storage medium according to claim 1, wherein the plurality of neural networks are arranged to form parallel neural networks to control the at least one parameter associated with printing the at least one target color on the substrate utilizing the print engine.

12. The non-transitory computer-readable storage medium according to claim 1, wherein the neural network component comprises:
    a calibration component adapted to calibrate a neural network of the neural network component, wherein the calibration component calibrates the neural network to the print engine for printing the at least one target color on the substrate utilizing the print engine.

13. The non-transitory computer-readable storage medium according to claim 12, wherein the calibration component includes a color test pattern analysis component for calibrating the neural network by analyzing at least one color test pattern.

14. The non-transitory computer-readable storage medium according to claim 13, wherein the calibration component is in operative communication with a spectrometer, wherein the spectrometer measures the color test pattern thereby facilitating the color test pattern analysis component to analyze the at least one color test pattern.

15. The non-transitory computer-readable storage medium according to claim 13, wherein the calibration component is in operative communication with a color sensing device, wherein the color sensing device measures the color test pattern thereby facilitating the color test pattern analysis component to analyze the at least one color test pattern, wherein the color sensing device is disposed within the printing system to measure the color test pattern therein.

16. The non-transitory computer-readable storage medium according to claim 12, wherein the calibration component calibrates the neural network to the print engine utilizing at least one of a quick propagation algorithm configured to update a weight of a node of the neural network and a back-propagation algorithm configured for additional adjustment of the weight of the node.

17. A system for printing target colors, comprising:
    a print-engine to mark a substrate with a plurality of colorants; and
    a plurality of feedforward neural networks, each of the plurality of feedfoward neural networks being trained to control a single colorant of the plurality of colorants, wherein each of the plurality of feedfoward neural networks is further trained separately to each other and to receive a common input, wherein the plurality of feedfoward neural networks perform parallel integration to control the print-engine to mark the substrate with the plurality of colorants.

* * * * *